United States Patent [19]

Yamamoto

[11] 4,358,273
[45] Nov. 9, 1982

[54] ELECTRONIC SELF-STUDY DEVICE

[75] Inventor: Haruo Yamamoto, Sayama, Japan

[73] Assignee: Casio Computer Co., Ltd., Tokyo, Japan

[21] Appl. No.: 212,491

[22] Filed: Dec. 3, 1980

[30] Foreign Application Priority Data

Dec. 22, 1979 [JP] Japan .................. 54-178328[U]

[51] Int. Cl.³ .................................... G09B 19/02
[52] U.S. Cl. ............................. 434/201; 434/202; 434/335
[58] Field of Search ............. 434/201, 202, 343, 335

[56] References Cited

U.S. PATENT DOCUMENTS

| | | | |
|---|---|---|---|
| 2,965,975 | 12/1960 | Briggs | 434/343 |
| 3,947,976 | 4/1976 | Hafel | 434/201 |
| 3,974,575 | 8/1976 | Duncan | 434/202 X |
| 4,179,822 | 12/1979 | Clark | 434/335 |

*Primary Examiner*—William H. Grieb
*Attorney, Agent, or Firm*—Frishauf, Holtz, Goodman & Woodward

[57] ABSTRACT

An electronic self-study device in which problems are randomly generated comprises input keys by means of which a user inputs an answer to a displayed problem, and a review key which is depressed by a user to again display a problem incorrectly answered by the user. The device includes a judging means which judges whether or not the answer inputted by the user is correct, and a problem storing means is responsive to the judging means for storing a problem to which a wrong answer has been inputted. Further provided is a problem read-out control device which is responsive to operation of the reviewing key for causing the problem to which an incorrect answer was given to again be displayed so that the user may again answer the problem to which an incorrect answer has been given. According to a further aspect of the invention, a plurality of problems is displayed and, responsive to operation of the reviewing key, the incorrectly answered problems are sequentially read out of the problem storing means so that the user can again answer the incorrectly solved problem.

7 Claims, 10 Drawing Figures

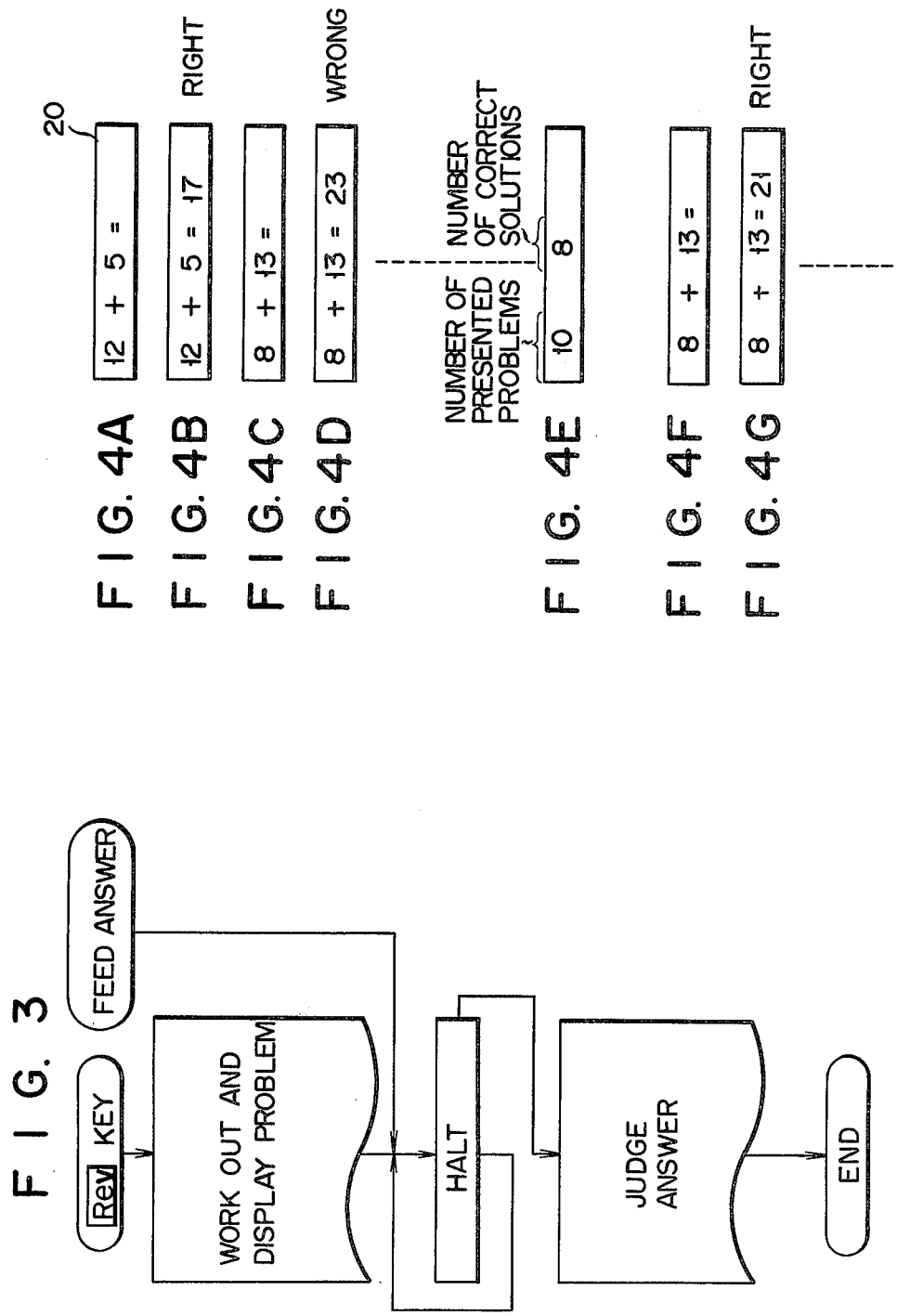

ELECTRONIC SELF-STUDY DEVICE

BACKGROUND OF THE INVENTION

This invention relates to an electronic self-study device having a function of permitting reviewing.

The general electronic self-study device is adapted such that it presents randomly worked-out problems to the user with a display means and judges whether inputs fed in by the user as the answers to these problems are right. Whether the user's answers are right is told by the device. However, with such electronic self-study device, which is adapted to present randomly worked-out problems, after the user has solved a predetermined number of problems, he cannot review the problems to which he gave wrong answers. This is a deficiency in promoting the efficiency of learning.

SUMMARY OF THE INVENTION

The invention has been developed in the light of the aforementioned drawbacks, and it has for its object to provide an electronic self-study device, which permits the reviewing of problems to which wrong answers have been given and can thus aid in promoting learning efficiency.

According to the present invention, an electronic self-study device comprises input means including a start key for starting a display of a problem; ten keys adapted to be depressed by a user to input an answer; and a reviewing key adapted to be depressed by a user to again display a problem incorrectly answered by the user. Further provided is problem presenting means which is responsive to operation of the start key to prepare a problem according to random members; display means for displaying the problem prepared by the problem presenting means; right answer calculating and storing means for effecting a calculation with respect to the prepared problem and for storing a right answer corresponding to a result of said calculation; answer storing means coupled to the input means for storing an answer to the displayed problem which is inputted by the user through operation of the ten keys; judging means coupled to the right answer calculation and storing means and to the answer storing means for comparing the right answer and the answer inputted by the user, and for producing a wrong signal when said right answer and said inputted answer do not coincide with each other and a right signal when said right answer and said inputted answer coincide with each other; problem storing means coupled to the judging means and to the problem presenting means and being responsive to said wrong signal to store the prepared problem to which said wrong signal corresponds; and problem readout control means responsive to operation of said reviewing key for causing the problem stored in the problem storing means to be read out by the operation of the reviewing key and for delivering said read-out problem to the calculating and storing means and to the display means, whereby when the user inputs an answer to said read-out problem, the correctness thereof is again judged by the judging means.

BRIEF DESCRIPTION OF THE DRAWINGS

FIGS. 2 and 3 are flow charts illustrating the operation of the same electronic self-study device; and FIGS. 4A through 4G are views showing display states of a display section obtained with corresponding operations of the device by the user.

DETAILED DESCRIPTION OF THE PREFERRED EMBODIMENT

Figure 1:
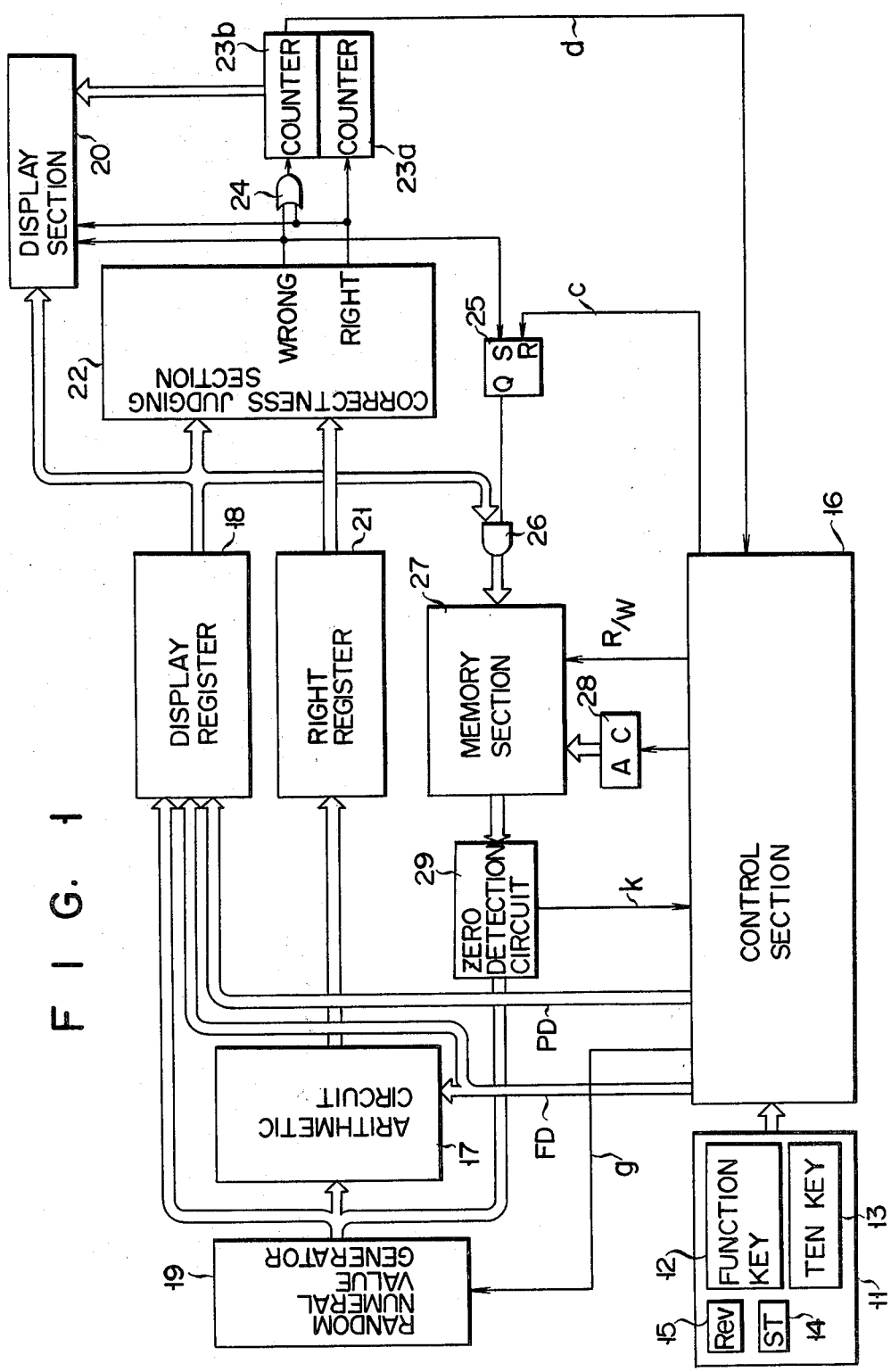
FIG. 1 is a schematic representation of the circuit of an embodiment of the electronic self-study device according to the invention.

Referring to FIG. 1, an input section 11 includes function keys 12 for specifying the kinds of arithmetic operations for solving problems such as addition, subtraction, multiplication and division, ten keys 13 for feeding in numeral values of answers, a start key (hereinafter referred to as ST key) 14 operated when starting a course of learning, and a reviewing key (hereinafter referred to as Rev key) 15 operated when reviewing a problem to which a wrong answer was given.

The data fed from the input section 11 in response to a keying operation is coupled to a control section 16. The control section 16 controls the operation of the self-study device according to the input data. The arithmetic operation which is specified by the operation of a function key 12 is supplied as function data FD to an arithmetic circuit 17 having arithmetic functions of the four rules (addition, subtraction, multiplication, division) and also to a display register 18. When the ST key 14 is operated, a control signal g is supplied from the control section 16 to a random numeral value generator 19. The random numeral value generator 19 randomly produces operand data according to the signal G. These operand data are coupled to the arithmetic circuit 17, and are also supplied together with the previously fed function data to a display section 20 for display as a presented problem therein. In the arithmetic circuit 17, an arithmetic operation specified by the function data FD is executed on the operand data, and the result is memorized in a right answer register 21. In the state with the presented problem displayed in the display section 20, by feeding an answer data with the operation of the ten key section 13, the answer data is coupled as numeral value data through the control section 16 to the display section 18 and displayed therein together with the presented problem. At this time, the numeral value data of the answer fed to the display register 18 and the right answer data memorized in the right answer register 21 are supplied to a correctness judging section 22. The correctness judging section 22 effects judgement of correctness through comparison of the input data fed thereto and produces a right or wrong answer signal depending upon whether the keyed answer is right or wrong. The right answer signal from the correctness judgement section 22 is coupled to a right answer counter 23a to increase the content thereof by "1", and it is also coupled through an OR gate 24 to an answer counter 23b. The wrong answer signal is coupled through the OR gate 24 to the answer counter 23b to increase the content thereof by "1", and is also coupled to a set terminal of a flip-flop 25. The output signal from the flip-flop 25 is coupled to an AND gate 26 to open this gate, whereby the problem data memorized in the display register 18 is coupled to a memory section 27. In the memory section 27, the problem data supplied from the AND gate 26 when the corresponding answer is wrong is memorized under the control of a read/write signal R/W supplied from the control section 16 and an address specification signal supplied from an address counter 28.

The user feeds the answer to each of a plurality of problems presented, and when answers to a predetermined number of, for instance ten, problems are given, a unit learning course is ended, and no further problem is presented. At the end of the unit learning course, the content of the answer counter 23b, i.e., the number of present problems, is displayed, and the right answer counter 23a outputs data of the number of right answers. Thus, the display section 20 provides a mark display. After the end of the operations of giving answers in one unit course of learning, every time the user operates the Rev key 15 a problem that was memorized in the memory section 27 when a wrong answer was given to it is read out and coupled through a zero detection circuit 29 to the display register 18 so that the problem is displayed once again.

The zero detection circuit 29 supplies a detection signal k to the control section 16 when it detects that the memory section 27 contains no memorized problem data. Although not shown in the Figure, the right answer and answer counters 23a and 23b are cleared or initialized at the time of the closure of the power source or when starting a new course of learning. When the content of the answer counter 23b reaches a predetermined number, i.e., when answers to a predetermined number of presented problems are given, a control signal is supplied from the counter 23b to the control section 16, indicating that all of the preset number of problems are solved.

When the new answer is fed by operating the Rev key 15, the correctness judging section 22 again effects judgement as to whether the new answer is right, so that the result is displayed in the display section 20 again.

Figure 2:
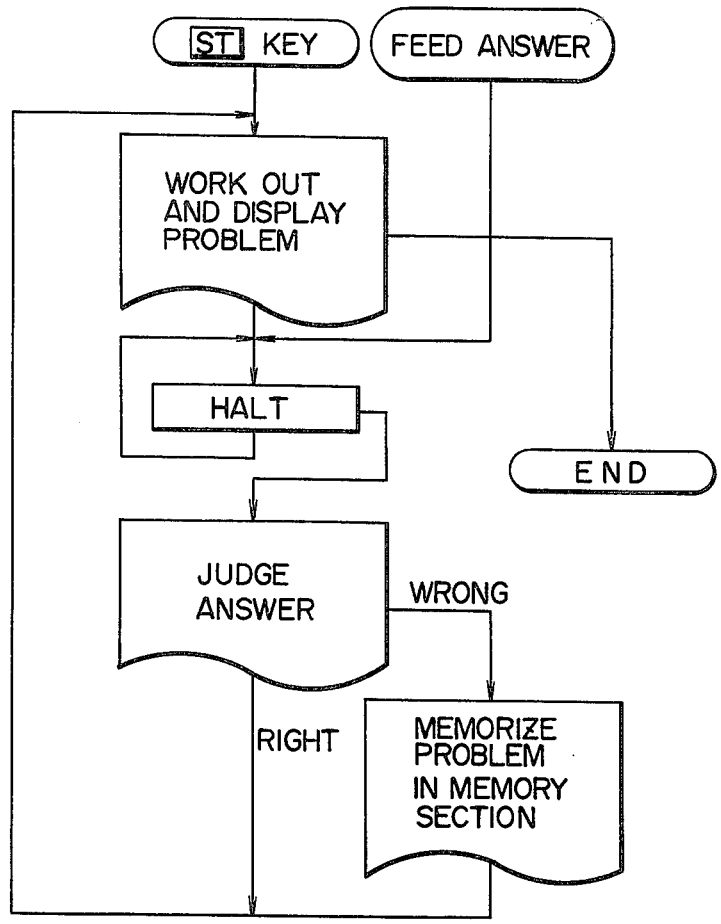

FIGS. 2 and 3 show flow charts of the operation of this electronic self-study device. As shown in FIG. 2, when the ST key 14 is operated, a problem is worked out and displayed. From this moment, a halt state sets in to be held until the next operation of the key. When an answer is subsequently fed, a correctness judgement step checking the correctness of the fed answer with reference to the content of the right answer register 21 is executed and, when the fed answer is wrong, the problem is memorized in the memory section 27.

FIG. 3 shows the operation that takes place at the time of reviewing after solving a predetermined number of problems. In this case, a problem memorized in the memory section 27 is read out in response to the operation of the Rev key 15. At this time, it is registered in the display register 18 while its right answer is registered in the right answer register 21, and then the device is held in a halt state until a new answer is fed in by the user. When a new answer is fed in, the judgement as to its correctness is executed.

FIGS. 4A through 4G show respective states of the display section 20 in a learning course. When the ST key 14 is operated in an addition mode, a problem "12+5=" as shown in FIG. 4A is displayed. By feeding in an answer "17" to this problem, the device produces a display as shown in FIG. 4B. When the operation of giving an answer in the above way is ended, the next problem is displayed as shown in FIG. 4C in response to a command from the control section 16, and by feeding in an answer the device produces a display as shown in FIG. 4D. When the fed in answer is wrong, a wrong answer detection signal is produced, and the relevant problem shown in FIG. 4C is memorized in the memory section 27. When the answering operations with respect to a preset number of problems are ended, the number of presented problems and number of right answers are displayed as shown in FIG. 4E in accordance with data supplied from the counters 23b and 23a.

After one unit of learning course has been ended in the above way, by operating the Rev key 15 the first one of the memorized problems which were incorrectly solved is displayed again as shown in FIG. 4F, and by feeding in a new answer it is displayed as shown in FIG. 4G.

What is claimed is:

1. An electronic self-study device comprising:

input means including a start key for starting a display of a problem; ten keys adapted to be depressed by a user to input an answer; and a reviewing key adapted to be depressed by a user to again display a problem incorrectly answered by the user;

problem presenting means coupled to said input means and being responsive to operation of said start key to prepare a problem according to random members;

display means coupled to said problem presenting means for displaying the problem prepared by said problem presenting means;

right answer calculating and storing means coupled to said problem presenting means for effecting a calculation with respect to said prepared problem and for storing a right answer corresponding to a result of said calculation;

answer storing means coupled to said input means for storing an answer to said displayed problem inputted by the user through operation of said ten keys;

judging means coupled to said right answer calculating and storing means and to said answer storing means for comparing said right answer and said answer inputted by the user, and for producing a wrong signal when said right answer and said inputted answer do not coincide with each other and a right signal when said right answer and said inputted answer do coincide with each other;

problem storing means coupled to said judging means and to said problem presenting means and being responsive to said wrong signal to store said prepared problem to which said wrong signal corresponds; and problem readout control means coupled to said input means and to said problem storing means and being responsive to operation of said reviewing key for causing the problem stored in said problem storing means to be read out by the operation of said reviewing key and for delivering said read-out problem to said calculating and storing means and to said display means, whereby when the user inputs an answer to said read-out problem, the correctness thereof is again judged by said judging means.

2. The electronic self-study device of claim 1, wherein said input means includes user operable designating keys for designating different kinds of problems; and said problem presenting means prepares a problem of a kind designated by the user operated designation key.

3. The electronic self-study device of claim 1 or 2, wherein said problem presenting means comprises means for sequentially preparing a problem according to random numbers each time an answer is inputted by a user by operating said ten keys of said input means.

4. The electronic self-study device of claim 3, wherein said problem storing means has a storage capacity for storing a plurality of problems.

5. The electronic self-study device of claim 4, wherein said problem readout control means includes means for sequentially reading out a plurality of problems stored in said problem storing means, each time said reviewing key of said input means is operated.

6. The electronic self-study device of claim 1 or 2, wherein said problem storing means has a storage capacity for storing a plurality of problems.

7. The electronic self-study device of claim 6, wherein said problem readout control means includes means for sequentially reading out a plurality of problems stored in said problem storing means each time said reviewing key of said input means is operated.

* * * * *